May 30, 1972      KOZI NAKAGAWA      3,666,515

PROCESS FOR THE PRODUCTION OF CEMENT EXPANSIVE ADDITIVES

Filed June 15, 1970

INVENTOR
KOZI NAKAGAWA

United States Patent Office
3,666,515
Patented May 30, 1972

3,666,515
PROCESS FOR THE PRODUCTION OF CEMENT
EXPANSIVE ADDITIVES
Kozi Nakagawa, Toyama, Japan, assignor to Denki
Kagaku Kogyo Kabushiki Kaisha, Tokyo, Japan
Filed June 15, 1970, Ser. No. 46,363
Claims priority, application Japan, June 13, 1969,
44/46,281; June 14, 1969, 44/46,618
Int. Cl. C04b
U.S. Cl. 106—314                                    11 Claims

ABSTRACT OF THE DISCLOSURE

A process for producing cement expansive additives in a direct resistance heating electric furnace comprising forming a melt of an inorganic fluoride around the electrodes in the furnace, adding gradually a mixture of an inorganic fluoride and a blend of CaO—CaSO$_4$—Al$_2$O$_3$ to the melt, heating the mixture to a temperature of from 1200 to 1400° C.

Figure 1:
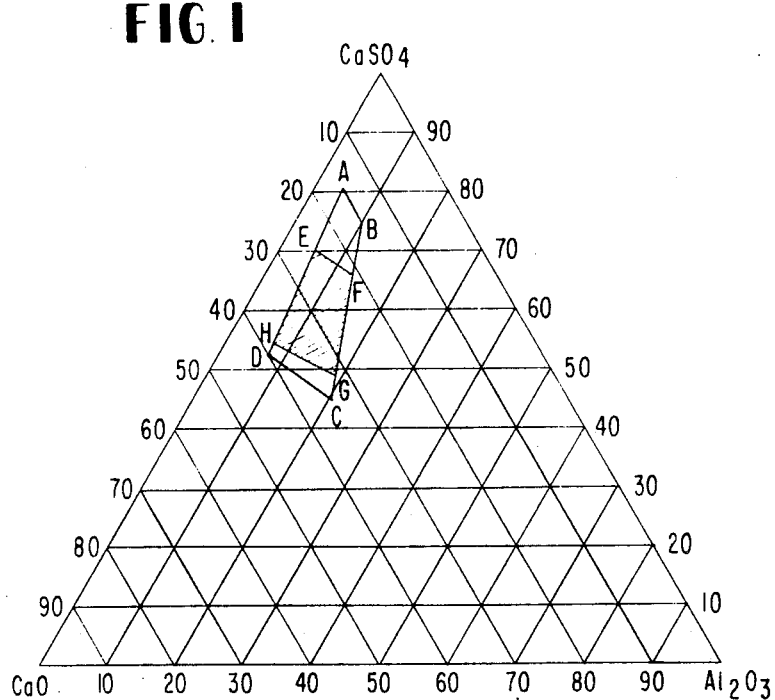

BACKGROUND OF THE INVENTION (1) Field of the invention

The present invention relates to a process for producing cement expansive additives in a direct resistance heating furnace. More particularly, it relates to a process for producing a CaO—CaSO$_4$—Al$_2$O$_3$ type cement inflating agent by forming a melt of an inorganic fluoride in a direct resistance heating furnace, gradually adding to the melt a blend of raw materials containing CaO, CaSO$_4$, and Al$_2$O$_3$ and at least one inorganic fluoride, and melting the blend by heating the mixture to from 1200 to 1400° C.

(2) Description of the prior art

Conventional cements have the great disadvantage of forming cracks from shrinking during the hydraulic-setting step. To prevent the occurrence of such cracks or to introduce a positive prestress to the secondary products of cement, such as concrete structures and Hume concrete pipes, various types of inflating agents have been reported. For example, inflating agents utilizing the hydraulic property of calcium oxide, magnesium oxide, ferric oxide, and the like; inflating agents containing more than 7.0% by weight of a mixture of calcium sulfoaluminate and ferric oxide and more than 21% of anhydrous gypsum; expansive additives prepared by blending calcium oxide and gypsum to calcium sulfoaluminate of which a part has been replaced with an alkaline earth metal and titanium oxide as shown in the specification of U.S. Pat. No. 3,303,037; an inflating agent prepared by blending gypsum and the like to a complex salt of a silicate and a sulfate; and an expansive cement, mainly consisting of alite, calcium sulfoaluminate, and calcium sulfate are known.

However, in conventional methods of the industrial production of the inflating agents containing calcium sulfoaluminate as the inflating component by sintering raw materials in a rotary kiln or a reverberatory furnace, the reaction rate or efficiency for converting the alumina component to calcium sulfoaluminate is limited to a definite level. That is, to increase the reaction rate or the efficiency of the reaction, it is necessary to heat the raw materials until they are molten and consequently the ring growth at the sintering zone in the kiln becomes vigorous. This makes the continuous operation of the reaction impossible. Also, in such cases, the reaction temperature is higher and hence sulfuric anhydride is scattered away greatly.

An object of the present invention is to provide a process for producing cement expansive additives unaccompanied with the aforesaid difficulties.

SUMMARY OF THE INVENTION

Thus, according to the process of this invention, in producing a CaO—CaSO$_4$—Al$_2$O$_3$ type cement expansive additive in an electric furnace, at least one inorganic fluoride is blended to the raw materials containing CaO, CaSO$_4$, and Al$_2$O$_3$ in a CaO/CaSO$_4$ mole ratio of from 0.5 to 1.8 and a CaO/Al$_2$O$_3$ mole ratio of from 3 to 9.

DETAILED DESCRIPTION OF THE INVENTION

As the inorganic fluorides used in the present invention, suitable fluorides are CaF$_2$, NaF, MgF$_2$, KF, AlF$_3$, Al$_2$(SiF$_6$)$_3$, NaAlF$_4$, Na$_3$AlF$_6$, AlF$_3$·3NaF, Na$_5$AlF$_{14}$, CaF$_2$·5Al$_2$O$_3$, CaF$_5$(PO$_4$)$_3$ and BaF$_2$.

Suitable raw materials, to which the inorganic fluorides are blended, are materials containing a large quantity of an alumina component, such as bauxite, alunite, aluminous shale, diaspore, and the like. Conventional raw materials for cement expansive additives containing lime and gypsum can be employed.

By the addition of the inorganic fluoride, such as CaF$_2$, to the raw materials for expansive additives, the fluidity of the melt is remarkably increased and hence the tapping operation of the product is facilitated.

BRIEF DESCRIPTION OF THE ACCOMPANYING DRAWINGS

FIG. 1 is a graphical representation of one embodiment of a composition used in the process of this invention. The graph in FIG. 1 is a triangular representation of the three component cement of the CaO, CaSO$_4$ and Al$_2$O$_3$ type. Each apex of the triangle represents a composition containing 100% of the designated component. Within the triangle, compositions having varying levels of each of the three components are represented. The areas inscribed by the points A, B, C, D, E, F, G and H designate CaO, CaSO$_4$ and Al$_2$O$_3$ compositions of this invention, and the coordinates of these points are as follows: (A) 16% CaO, 80% CaSO$_4$ and 4% Al$_2$O$_3$; (B) 16% CaO, 74% CaSO$_4$ and 10% Al$_2$O$_3$; (C) 36% CaO, 44% CaSO$_4$ and 20% Al$_2$O$_3$; (D) 40% CaO, 53% CaSO$_4$ and 7% Al$_2$O$_3$; (E) 26% CaO, 69% CaSO$_4$ and 5% Al$_2$O$_3$; (F) 22% CaO, 66% CaSO$_4$ and 12% Al$_2$O$_3$; (G) 33% CaO, 48% CaSO$_4$ and 19% Al$_2$O$_3$; and (H) 38% CaO, 54% CaSO$_4$ and 8% Al$_2$O$_3$; with all percentages being by weight.

Figure 2:
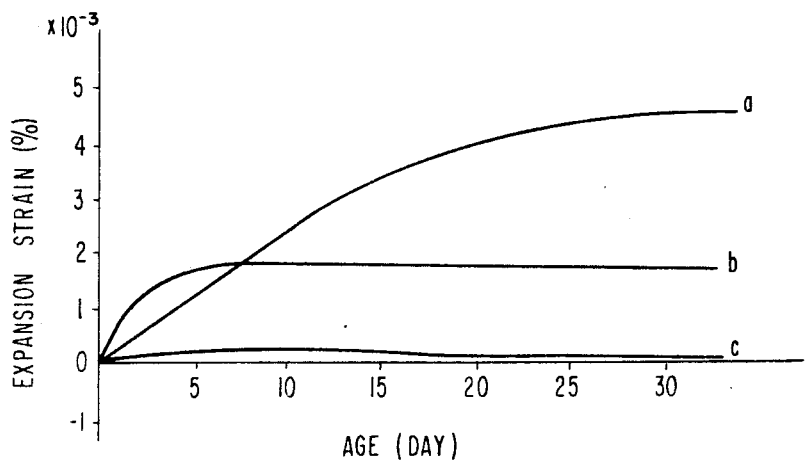

FIG. 2 is a graph showing the relationship between expansion strain on aging of a concrete sample prepared with cements using expansive additives. The abscissa represents the age in days and the ordinate represents the expansion strain in percent ($\times 10^{-3}$). The curves $a$, $b$ and $c$ represent concrete samples prepared from cements containing cement expansive additives of the invention, a conventionally prepared cement expansive additive (a calcium sulfo aluminate produced in Japan by Denka under the trade name DENKA CSA #20) and no additive, respectively.

The amount of the inorganic fluorides added to the raw materials generally ranges from 0.2 to 10% by weight for cement compositions, i.e., a cement comprising the CaO—CaSO$_4$—Al$_2$O$_3$ system, inscribed within the area ABCD shown in FIG. 1 of the accompanying drawings, is used in this invention. For compositions inscribed in the shadowed area EFGH in FIG. 1 from 0.2 to 5% by weight of fluoride is preferable, while for compositions inscribed in the area GHDC, less than 5% by weight of the fluoride is preferable, since, if the proportion is larger than 5% by weight, the fluidity of the melt is reduced. In addition, where cryolite is used as the fluoride source, the objects of the process of this invention can be attained by using an amount of one half of the necessary amount of fluoride. On the other hand, in the area ABEF, the amount of the inorganic fluoride added is preferably from about 0.2 to 1% by weight. In any case, the amount of the additive is preferably as low as possible but within the effective range.

For obtaining the expansion coefficient, which is a necessary characteristic as a cement expansive additive, a comparison test was conducted by measuring the effective expansion rate from the free expansion rate of a mortar measured by means of the test procedure of JIS R–5201 and from the stress by the expansion measured by using a sample of reinforced concrete. It has been confirmed that a blend having a composition within the area EFGH of FIG. 1 showed the best qualities and blends having a composition within the area ABCD of FIG. 1 can be profitably used in the process of this invention.

The mole ratios of the chemical composition of the raw materials, to which the inorganic fluoride is blended and used in the process of this invention are a $CaO/CaSO_4$ mole ratio of from 0.5 to 1.8 and a $CaO/Al_2O_3$ mole ratio of from 3 to 9. The preferred melting temperature ranges from 1200 to 1400° C.

If the mole ratio of CaO to $CaSO_4$ is higher than 1.8, the temperature of the melt is higher than 1500° C. and sulfuric anhydride is very vigorously expelled. Therefore, to continue the tapping operation, the amount of the inorganic fluoride must be increased by over 10% by weight, which reduces the characteristics of the products. On the other hand, if the mole ratio of $CaO/CaSO_4$ is less than 0.5, the fluidity of the melt may be improved, the temperature of the melt is decreased to lower than 1200° C., whereby the formation of calcium sulfonaluminate is reduced and $12CaO \cdot 7Al_2O_3$ is predominately formed.

According to the process of this invention, the fluidity of the melt is improved to about three times of that conventionally obtained, whereby the operation is facilitated greatly. Also, the reaction yield for the calcium sulfoaluminate is increased to 1.3 times of that obtained conventionally. In addition the bending strength and the compressive strength of a mortar prepared by blending the expansive additives of this invention with an ordinary portland cement are from 20 to 30% higher than those of a mortar prepared by using conventional expansive additives.

There is an important disadvantage in starting the production of the expansive additives in a direct resistance heating furnace using the above-mentioned blended raw materials in that when the blended raw materials are directly charged to the electric furnace and heated, the gypsum component is decomposed and sulfuric anhydride is vigorously expelled, whereby expansive additives having desired composition cannot be produced.

The inventors have studied the start up method in the production of the expansive additives by means of a direct resistance heating furnace and as the results thereof the process of this invention has been established.

That is, in the case of producing the aforesaid expansive additives in a direct resistance heating electric furnace having carbon electrodes, at least one of the above-mentioned inorganic fluorides is preliminarily charged as the starting material at the bottom of the furnace so that the inorganic fluoride fills at least the space surrounding the lower ends of the electrodes. The electrodes contact the starting material to pass electric current, whereby the complete melt of the inorganic fluoride is formed. The raw material blended above is gradually added to the melt to increase the volume of the melt and when the volume of the melt reaches the allowable level of the furnace, the melt is tapped from the furnace. From the time when the blended raw material is added as described above, the operation of the electric furnace is shifted from the arc operation to a resistance operation. Thereafter the blended raw materials are continuously supplied to the furnace and the tapping operation is repeated in a stationary operation. By the procedure described above, a completely molten inflating agent can be continuously produced. Moreover, when a carbonaceous material, such as charcoal or coke, is added to the melt before or after the formation thereof, the effect of the present invention can be further improved. That is, the starting material, i.e., the molten inorganic fluoride, is gradually diluted by the blended raw materials, added gradually, and hence the addition of the carbonaceous material is effective to compensate for the electric conductivity of the melt. The carbonaceous material can be added as a powder or as a mass but the amount thereof must be sufficient to pass an electric current. Also, the carbonaceous material is not necessarily mixed with the inorganic fluoride but the inorganic fluoride can be placed around the carbonaceous material.

As described above, if the blended raw materials are directly charged to an electric arc furnace having a high temperature, anhydrous gypsum having a decomposition point at about 1400° C. is decomposed suddenly and a sulfuric anhydride gas is generated vigorously. Thus, expansive additives having the desired composition cannot be obtained. It may be possible to form a melt mainly consisting of $CaO \cdot Al_2O_3$ or $12CaO \cdot 7Al_2O_3$ and then charging the blended raw materials gradually, but in such case the temperature of the melt rises higher than 1400° C. and then the expulsion of sulfuric anhydride becomes vigorous.

As described above, in the process of this invention, in starting the production of cement expansive additives in a direct resistance heating electric furnace, a melt of the aforesaid inorganic fluoride or fluorides is formed as the starting material around the electrodes. Thereafter, the blended raw materials are gradually added to the melt and the operation is converted into a stationary operation. In addition, the operation, electrically speaking, is changed from an electric arc heating operation to an electric resistance heating operation but since the blended materials contain a gypsum component which is readily decomposed, the heating procedure is preferably conducted as follows:

To increase the yield for the products per unit time and to improve the reaction efficiency of the alumina component to result in calcium sulfoaluminate and since the blended raw materials contain CaO, $CaSO_4$ and $Al_2O_3$ in the mole ratios of from 0.5 to 1.8 ($CaO/CaSO_4$) and from 3 to 9 ($CaO/Al_2O_3$), the system is melted in a direct resistance heating electric furnace.

By the term "direct resistance heating electric furnace" is meant an electric furnace in which a melt itself of raw materials is utilized directly as the direct electric resistance with graphite electrodes or Sederberg electrodes being used as the electrodes.

It may be considered that in using such an electric furnace, the atmosphere in the furnace becomes reductive and the expulsion of sulfuric anhydride may be accelerated thereby, but according to the present invention, the CaO and $CaSO_4$ form an eutectic mixture in a range of from 0.5 to 1.8 of $CaO/CaSO_4$ as already known, whereby decomposition is suppressed and little expulsion of sulfuric anhydride occurs.

The size of the raw materials used is preferably less than about 0.5 mm. for the bauxite and less than 2.5 mm. for the lime. Raw materials of a larger size than these values are undesirable since the raw materials remain unreacted or unmolten in the melt removed. Further, even if their retention time in the furnace is prolonged, it is difficult to remove such unreacted or unmolten materials. Conversely, if the particle size of the raw materials is too fine, the reaction rate becomes low, the temperature in the furnace rapidly increases, whereby the suppression of the expulsion of sulfuric anhydride become impossible. In addition, the tapping of the molten product becomes difficult due to a reduction in fluidity. Accordingly, the preferred grain size is one in which more than 60% remains when sieved with a sieve having a 44 micron mesh size. Thus, it is desirable that the size ratio of the raw materials is in the range of from 2 to 8 for $CaO/Al_2O_3$.

The invention will now be explained with reference to the following examples.

Example 1

Bauxite, quick lime (calcium oxide), and anhydrous chemical gypsum were blended to obtain a mole ratio of $CaO/Al_2O_3/CaSO_4$ of 5/1/4. The blend was pulverized to provide the raw material. $CaF_2$ was added in an amount of 1% by weight to the weight of the raw materials.

A mixture of about 20 kg. of $CaF_2$ and charcoal was charged around the carbon electrodes at the bottom of a Girod-furnace of 450 kw. and an electric arc was generated to form a melt having a temperature of 1170° C. To the melt was added gradually the above-prepared raw material and, thereafter, it was confirmed on the analysis of the pulsating wave form using an oscilloscope that the system of the electric furnace was converted into a resistance heating furnace.

With the increase of the raw materials, the volume of the pool of the melt increased gradually. In addition, the temperature of the melt reached 1370° C. but neither severe decomposition nor severe scattering of sulfuric anhydride occurred. Thereafter, the melt, about 70% of the pool, was tapped from the furnace and with supplying the raw materials, continuously, the tapping operation was repeated continuously for 148 hours. The fluidity of the melt was good and the scattering of sulfuric anhydride did not occur throughout the whole operation and also the expansion of the expansive additive thus prepared was better than one prepared using rotary kiln system.

The results of the chemical analysis of the raw materials are shown in Table 1. In addition, the secondary voltage and the average load in operation were 40–122 volts and about 218 kw.

TABLE 1

|  | SiO₂ | Al₂O₃ | Fe₂O₃ | CaO | SO₃ | Others | Total, percent |
|---|---|---|---|---|---|---|---|
| Raw material | 0.9 | 12.50 | 0.7 | 51.5 | 33.4 | 1.0 | 100 |
| Molten product | 1.7 | 12.00 | 0.7 | 52.1 | 32.0 | 1.5 | 100 |

Example 2

A mixture of 3 parts by weight of $BaF_2$, 4 parts by weight of $CaF_2$, and 3 parts by weight of $Na_3AlF_6$ was charged together with coke particles at the bottom of the electric furnace used as in Example 1 and around the electrodes. By forming an electric arc, a melt of about 1080° C. was formed.

Powdered blended raw materials prepared by mixing bauxite, calcium oxide and gypsum, so that the molar blending ratios were 1.33 $CaO/CaSO_4$ and 5.7 $CaO/Al_2O_3$, were gradually added to the melt, whereby the operation was changed to a resistance operation and thereafter the melt was tapped from the furnace. Subsequently, while supplying the raw material continuously to the furnace, the melt thus formed was tapped from the furnace repeatedly, whereby the expansive additive was produced continuously. The temperature of the melt reached 1320° C., the scattering of sulfuric anhydride was less and an inflating agent having excellent quality was obtained.

In addition, after the operation had been changed to a resistance operation, cryolite was added in an amount of 1% by weight to the weight of the raw materials. The compositions of the raw materials used and that of the inflating agent thus produced are shown in the following table.

TABLE 2

|  | Ignition loss | Al₂O₃ | CaO | SO₃ | SiO₂ | Fe₂O₃ | Others | Total, percent |
|---|---|---|---|---|---|---|---|---|
| Lime |  | 0.5 | 95.7 | 0.2 | 0.4 | 1.9 | 0.8 | 99.5 |
| Bauxite | 0.3 | 86.2 | 0.3 |  | 3.9 | 5.5 | 3.4 | 99.6 |
| Gypsum | 1.7 | 0.3 | 39.4 | 57.8 | 0.3 | 0.1 | 0.3 | 99.9 |
| Expansive additives | 0.2 | 9.5 | 51.8 | 36.0 | 1.5 | 0.8 | 0.9 | 100.7 |

Comparison Example 1.—A comparison test was conducted using the same electric furnace and raw materials as used in Example 1. Without forming the preliminary melt as was done in the above examples, the raw materials were charged directly in the furnace around the graphite electrode and by passing an electric current, an electric arc was formed, whereby a melt of the raw materials was formed. In this case, the temperature of the melt was increased to about 1600° C. and marked scattering of sulfuric anhydride occurred. Furthermore, the raw materials supplied afterwards were not mixed smoothly or uniformly, the eutectic mixture was not formed readily and hence continuous operation was impossible. The composition of the melt is shown in the following table.

TABLE 3

|  | Melt percent |
|---|---|
| SiO₂ | 1.4 |
| Al₂O₃ | 18.4 |
| Fe₂O₃ | 1.1 |
| CaO | 77.2 |
| SO₃ | 0.6 |
| Others | 1.3 |
| Total | 100 |

As is clear from Table 3, the gypsum used as the raw material had essentially been decomposed.

Examples of the use of expansive additives: The excellent effects of the expansive additives prepared by the process of this invention are shown herein.

Each of the clinkers of the expansive additives prepared in Example 1 and the clinker of the expansive additives prepared by a conventional method was pulverized to 2800 cm.²/g. and 12 parts by weight of the pulverized clinker was blended with 88 parts by weight of ordinary portland cement to provide an expansive cement. Using the expansive cement thus prepared a specimen of reinforced concrete was prepared. The specimen was prepared as follows: The expansive cement was mixed with 20 mm. of the maximum aggregate 3.8 of stand and 6.9 of gravel in F.M. and with a 40% water/cement ratio. A fourth pc. steel rod (diameter 12 mm.) was positioned at the center of a mold, 250 cm. in length and 15 cm. in height, and the mix was poured into the mold. After 6 hours, the mold was released and to measure the expansion rate, a test pin was inserted in it. The specimen was cured under a relative humidity of above 90% and a Hargen Bagar type handy strain gauge was used. The effective expansion thus measured periodically and expansion strain data obtained for the period up to 30 days are shown in FIG. 2. Curve *a* represents the data obtained for the sample prepared using the expansion additive prepared according to the process of this invention. Curve *b* represents the data obtained for the sample prepared using a conventionally prepared expansion additive (a calcium sulfo aluminate produced in Japan by Denka under the tradename DENKA CSA #20), and curve c represents the data obtained for the sample prepared containing no additive.

The results obtained after 100 days for the strength test (using the three edge bearning method) are shown in Table 4 below.

TABLE 4

| Expansive additive | Effective expansion force (ton) | Strength test | |
|---|---|---|---|
| | | Initially cracked load (ton) | Load (tons) |
| a. Invention | 1.35 | 0.42 | 2.75 |
| b. Conventional | 0.50 | 0.37 | 2.32 |
| c. None | 0.0 | 0.23 | 1.5 |

As is clear from the above table, when the expansive additive of this invention was applied to a chemical prestress process, better properties were obtained than with expansive additives conventionally prepared.

In addition, the effective expansion force data above were obtained by the method described in the report of Muguroma et al. in Fifth International Cement Chemical Symposium; Part IV, Session-4 using 243,000 kg./cm.$^2$ as the concrete elasticity and 1,980,000 kg./cm.$^2$ as the pc. steel rod elasticity.

The advantages of the process of this invention are summarized as follows:

(1) By forming the melt of the fluoride around the electrodes in producing the expansive additives in an electric furnace, raw materials added afterwards can be melted smoothly.

(2) Since the raw materials can be melted in a reducing atmosphere at a higher temperature than that using a rotary kiln, the decomposition of gypsum into SO$_3$ was reduced, a uniform expansive additive can be obtained, and the reaction efficiency for calcium sulfoaluminate was increased about 30%.

(3) Production can be continued for a long period of time, which has never been the case with a rotary kiln system.

(4) The bending strength and compressive strength of a mortar prepared by blending the expansive additive of this invention to a cement is increased about 30% as compared with using a mortar containing an expansive additive prepared by conventional methods.

(5) The expansion characteristics were increased markedly as compared with sintered products. Thus, the effective expansion rate could be obtained by employing a smaller amount of the expansive additives prepared by the process of the invention than that of conventional products.

What is claimed is:

1. In a process for producing a calcium sulfo-aluminate-type cement expansive additive containing CaO, CaSO$_4$ and Al$_2$O$_3$ in a molar ratio of CaO to CaSO$_4$ of from 0.5 to 1.8 and a molar ratio of CaO to Al$_2$O$_3$ of from 3 to 9 in a direct resistance heating electric furnace, the improvement which comprises forming a melt mainly consisting of at least one inorganic fluoride initiator around the electrodes in the furnace, adding gradually to the melt a raw material blend of an inorganic fluoride and CaO, CaSO$_4$ and Al$_2$O$_3$, and maintaining the molten system at from 1,200 to 1,400° C., and maintaining the inorganic fluoride level sufficient to improve the fluidity of the melt and repress the evolution of sulfuric anhydride, and then discharging the final product of the calcium sulfo aluminate-type cement additive from the furnace.

2. The process as claimed in claim 1, wherein said inorganic fluoride is selected from the group consisting of CaF$_2$, MgF$_2$, AlF$_3$, CaF$_2$·5Al$_2$O$_3$, Ca$_5$F(PO$_4$)$_3$, Na$_3$AlF$_6$, BaF$_2$ and mixtures thereof.

3. The process as claimed in claim 1, wherein said inorganic fluoride is present in the raw material blend at a level ranging from 0.2 to 10% by weight to the raw material blend.

4. The process as claimed in claim 1, wherein the composition of said raw material blend is in the range of the area ABEF shown in the triangular coordinate of FIG. 1 and the inorganic fluoride is CaF$_2$ and is added to the raw material blend at a level ranging from 0.2 to 1% by weight to the raw material blend.

5. The process as claimed in claim 1, wherein the composition of said raw material blend is in the range of the area EFGH shown in the triangular coordinate of FIG. 1 and the inorganic fluoride is CaF$_2$ and is added to the raw material blend at a level ranging from 0.2 to 5% by weight to the raw material blend.

6. The process as claimed in claim 1, wherein the composition of said raw material blend is in the range of the area GHDC shown in the triangular coordinate of FIG. 1 and the inorganic fluoride is CaF$_2$ and is added to the raw material blend at a level ranging from 5 to 10% by weight to the raw material blend.

7. The process as claimed in claim 1, wherein the composition of said raw material blend is in the range of the area ABEF shown in the triangular coordinate of FIG. 1 and the inorganic fluoride is Na$_3$AlF$_6$ and is added to the raw material blend at a level ranging from 0.2 to 0.5% by weight to the raw material blend.

8. The process as claimed in claim 1, wherein the composition of said raw material blend is in the range of the area EFGH shown in the triangular coordinate of FIG. 1 and the inorganic fluoride is Na$_3$AlF$_6$ and is added to the raw material blend at a level ranging from 0.2 to 0.5% by weight to the raw material blend.

9. The process as claimed in claim 1, wherein the composition of said raw material blend is in the range of the area GHDC shown in the triangular coordinate of FIG. 1 and the inorganic fluoride is Na$_3$AlF$_6$ and is added to the raw material blend at a level ranging from 2.5 to 5% by weight to the raw material blend.

10. In a process for producing a calcium sulfo aluminate-type cement additive containing CaO, CaSO$_4$ and Al$_2$O$_3$ in a direct resistance heating electric furnace, the improvement which comprises forming a melt mainly consisting of at least one inorganic fluoride around the electrodes in the furnace, adding gradually to the melt a raw material blend of an inorganic fluoride and CaO, CaSO$_4$ and Al$_2$O$_3$ and maintaining the molten system at from 1,200 to 1,400° C., and maintaining the inorganic fluoride level sufficient to improve the fluidity of the melt and repress the evolution of sulfuric anhydride, to maintain a stationary operation when the operation of the electric furnace is shifted from the arc operation to the resistance operation, and thereafter supplying the blended raw materials and discharging the final product of the calcium sulfo aluminate-type cement additive from the furnace.

11. The process as in claim 10, wherein the composition of said raw material is in the range of the area ABCD shown in the triangular coordinate in FIG. 1.

References Cited

UNITED STATES PATENTS

| 3,303,037 | 2/1967 | Klein | 106—314 |
| 3,251,701 | 5/1966 | Klein | 106—100 |
| 3,017,246 | 1/1962 | Kamlet | 106—100 |
| 2,465,278 | 3/1949 | Schenker | 106—314 |

TOBIAS E. LEVOW, Primary Examiner

W. T. SCOTT, Assistant Examiner

U.S. Cl. X.R.

106—89, 102, 104